United States Patent
Rais et al.

(10) Patent No.: US 9,605,866 B2
(45) Date of Patent: Mar. 28, 2017

(54) AIR VENT

(71) Applicant: MAHLE International GmbH, Stuttgart (DE)

(72) Inventors: Thomas Rais, Marbach-Neckar (DE); Michael Komowski, Weil der Stadt (DE)

(73) Assignee: MAHLE International GmbH, Stuttgart (DE)

( * ) Notice: Subject to any disclaimer, the term of this patent is extended or adjusted under 35 U.S.C. 154(b) by 306 days.

(21) Appl. No.: 14/278,825

(22) Filed: May 15, 2014

(65) Prior Publication Data

US 2014/0342657 A1    Nov. 20, 2014

(30) Foreign Application Priority Data

May 16, 2013  (DE) .................. 10 2013 209 133

(51) Int. Cl.
*B60H 1/34* (2006.01)
*F24F 7/00* (2006.01)
*F24F 13/065* (2006.01)

(52) U.S. Cl.
CPC ......... *F24F 13/065* (2013.01); *B60H 1/3442* (2013.01); *B60H 2001/3471* (2013.01)

(58) Field of Classification Search
CPC ................. F24F 13/065; B60H 1/3442; B60H 2001/3471
USPC ................................. 454/358, 155
See application file for complete search history.

(56) References Cited

U.S. PATENT DOCUMENTS

| 4,006,673 A | 2/1977 | Meyer et al. |
| 5,328,152 A | 7/1994 | Castle |
| 7,527,553 B2 * | 5/2009 | Steinbeiss ............ B60H 1/3442 454/155 |
| 2013/0059520 A1 * | 3/2013 | Wolf .................... B60H 1/3457 454/154 |

FOREIGN PATENT DOCUMENTS

| DE | 24 13 628 A1 | 10/1975 |
| DE | 103 39 339 A1 | 3/2005 |
| DE | 10 2005 035 768 A1 | 2/2006 |
| EP | 0 849 104 A2 | 8/1998 |
| FR | 2972390 A1 * | 9/2012 ........... B60H 1/3435 |

OTHER PUBLICATIONS

English translation of Abstract of document FR 2972390A1.*

* cited by examiner

*Primary Examiner* — Helena Kosanovic
(74) *Attorney, Agent, or Firm* — Muncy, Geissler, Olds & Lowe, P.C.

(57) ABSTRACT

An air vent having a housing, a first control element and a second control element, wherein the housing forms a flow passage, wherein the first control element is supported on the housing so as to be rotatable about a first axis of rotation and the second control element is supported on the housing so as to be rotatable about a second axis of rotation, wherein the second axis of rotation is perpendicular to the first axis of rotation, wherein the first control element is connected to the second control element by a coupling element and the control elements are movable relative to one another.

13 Claims, 4 Drawing Sheets

AIR VENT

This nonprovisional application claims priority under 35 U.S.C. §119(a) to German Patent Application No. 10 2013 209 133.8, which was filed in Germany on May 16, 2013, and which is herein incorporated by reference.

BACKGROUND OF THE INVENTION

Field of the Invention

The invention relates to an air vent having a housing, having a first control element and a second control element, wherein the housing forms a flow passage, wherein the first control element is supported on the housing so as to be rotatable about a first axis of rotation and the second control element is supported on the housing so as to be rotatable about a second axis of rotation, wherein the second axis of rotation is perpendicular to the first axis of rotation.

Description of the Background Art

Air vents are used to direct a flow of air and in some cases to influence it. This may be a flow of air in the passenger compartment of a motor vehicle, for example. In this context, a distinction can be drawn between directed and diffuse air flows, in particular. Diffuse air flows can be produced in air vents by air deflection elements introduced into the air stream.

Stacks of annular disks are used as air deflection elements, for example. They can be rotated relative to one another about a common axis, by which means the air flow within the air vent is influenced such that a diffuse air flow emerges at the outlet of the air vent.

It is a particular disadvantage of the prior art solutions that a horizontal adjustment of the air vent also affects the choice of flow mode. Because of the engineering design of the prior art air vents, the two basic functions of mode selection (focused or diffuse) and orientation of the air flow in the horizontal direction (right or left) oftentimes are coupled together in such a manner that changing one of the functions also retroactively affects the other function.

Solutions are known in the prior art that provide complex kinematic mechanisms to ensure decoupling of the two basic functions. These kinematic mechanisms make the construction of the air vent complex and costly. Moreover, the kinematic mechanisms are failure-prone and require increased installation space.

SUMMARY OF THE INVENTION

It is therefore an object of the present invention to provide an air vent that is optimized in comparison to the prior art solutions. To this end, it is desirable to improve, in particular, the kinematic mechanism that allows an adjustment of the air vent in its orientation and in the choice of focused or diffuse mode, in such a manner that independent adjustment of the two functions is made possible. Furthermore, the air vent should have as simple and economical a construction as possible.

An exemplary embodiment of the invention provides an air vent having a housing, and having a first control element and a second control element, wherein the housing forms a flow passage, wherein the first control element is supported on the housing so as to be rotatable about a first axis of rotation and the second control element is supported on the housing so as to be rotatable about a second axis of rotation, wherein the second axis of rotation is perpendicular to the first axis of rotation, wherein the first control element is connected to the second control element by a coupling element and the control elements are movable relative to one another.

A coupling element can establish a mechanical connection between the first control element and the second control element, for example. In this way, a motion of the first control element can be transmitted to the second control element. A coupling of this nature is advantageous, especially in the context of simplifying the operation of the air vent.

In an exemplary installation position, the second axis of rotation is vertical in its orientation, while the first axis of rotation is horizontal in its orientation. For the motion of the second control element about the second axis of rotation, this produces a rotating motion to the left or to the right.

In addition, it can be especially advantageous for the second control element to have a plurality of air deflection elements that are mounted so as to be rotatable relative to one another about a common, third axis of rotation, wherein the third axis of rotation is perpendicular to the second axis of rotation in its orientation.

By means of a plurality of air deflection elements, it is possible to influence the characteristics of the air flow emerging from the air vent, in particular. In advantageous fashion, a directed air flow or a diffuse air flow can be produced by the air deflection elements. The air deflection elements in this context can be composed, for instance, of annular disks that are interconnected with one another in such a manner that a motion of one of the annular disks also causes a motion of the other annular disks. This can be achieved using driving pins or stop elements, for example.

An exemplary embodiment provides a rotation of the air deflection elements relative to one another about the third axis of rotation can be produced by a rotation of the first control element about the first axis of rotation.

A coupling of the motion of the air deflection elements to the motion of the first control element, in particular, is advantageous because simple control of the air deflection elements can be achieved in this way.

The second control element can be accommodated in openings of the first control element, wherein the openings are composed of two oblong holes arranged essentially opposite one another, wherein the oblong holes have a radial orientation around the circumference of the first control element.

The maximum adjustment range of the first control element relative to the second control element is advantageously defined by the openings in this design. In this design, the oblong holes are advantageously oriented in a radially circumferential direction. This orientation permits an especially wide adjustment range. At the same time, additional stability of the air vent can be achieved through support of the second control element at the edges of the oblong holes.

In an alternative embodiment of the invention, provision can be made for a rotation of the second control element about the second axis of rotation to be executable without reaction with regard to a constrained motion of the first control element and/or of the air deflection elements.

This is especially advantageous for the purpose of producing a decoupling of the motion of the second control element. This has the result that the second control element can be twisted about the second axis of rotation without producing either a constrained motion of the first control element about the first axis of rotation or a constrained motion of the air deflection elements about the third axis of rotation. In this way, it is possible to pivot the air vent without changing the flow characteristics (focused or diffuse) in so doing.

The second control element can be composed of a rotationally symmetric hollow body or of a hollow, cylindrical body, wherein an opening is provided in the external surface of the hollow body or of the hollow cylinder through which the coupling element passes. The hollow body here can also be barrel-like or polygonal, for example octagonal, in design.

A hollow cylindrical design is advantageous in particular when the flow passage has a circular cross-section. Alternately, the second control element can also be based on a spherical body, for example. The second control element in this design is configured such that an air stream in the flow passage can flow through the second control element with as little hindrance as possible.

A connection between the first control element and the air deflection elements of the second control element can be produced through the coupling element.

In order to create a coupling between the air deflection elements and the first control element, the second control element in this design advantageously has an opening through which the coupling element can be passed. The maximum range of motion of the coupling element is dependent on the dimensions of the opening.

It can also be useful for the first axis of rotation to be essentially parallel to the primary flow direction of the flow passage in its orientation.

An arrangement of this nature is advantageous, especially with regard to unhindered flow propagation.

In addition, the first control element and the second control element can be located inside of the housing or for the first control element to be located outside of the housing and the second control element to be located inside of the housing.

Depending on the conditions on and in the housing, an arrangement of the first control element either inside or outside of the housing may be advantageous. An arrangement outside of the housing is especially advantageous to ensure simple adjustability of the control element. With an arrangement inside of the housing, a more compact configuration of the air vent as a whole can be achieved.

It is also advantageous if the relative motion of the first control element about the second control element is delimited by walls that delimit the oblong holes in the second control element.

The stability of the air vent as a whole is improved by such a delimitation of the relative motion. Moreover, in this way the relative motion is kept within predefinable limits, as a result of which the air vent can be better matched to its application purpose.

In an alternative embodiment of the invention, provision can be made for the coupling element to be guided in a slide-type guide in the first control element.

A slide-type guide for the coupling element is particularly advantageous in order to permit movability of the coupling element in a defined spatial direction. At the same time, when a motion occurs in another spatial direction it is possible for the coupling element to be carried along, which results in a motion of the elements connected to the coupling element. In one exemplary embodiment, by this means a motion of, e.g., the air deflection elements can be achieved through a rotation of the first control element, while in contrast a rotation of the second control element causes no motion of the air deflection elements or of the first control element.

In addition, the slide-type guide can be designed such that, when the second control element is rotated about the second axis of rotation, the coupling element is movable in the slide-type guide without affecting the first control element and/or the air deflection elements.

As a result of this decoupling, it is possible to deflect the air stream horizontally or vertically by adjusting the second control element without causing the characteristics of the air stream [to change] as a result of unintended adjustment of the first control element or of the air deflection elements in so doing.

The coupling element can be carried along by the slide-type guide by means of a rotational motion of the first control element about the first axis of rotation, by which means a rotation of the air deflection elements relative to one another about the third axis of rotation can be produced.

An embodiment of this nature permits adjustment of the air deflection elements by rotating the first control element without adversely affecting the second control element in the process.

The air deflection elements can be implemented as a stack of annular disks, as a swirl element, or as a swirler.

It is also useful for the oblong holes to have a lenticular, convex, concave, or biconvex or biconcave cross-section.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
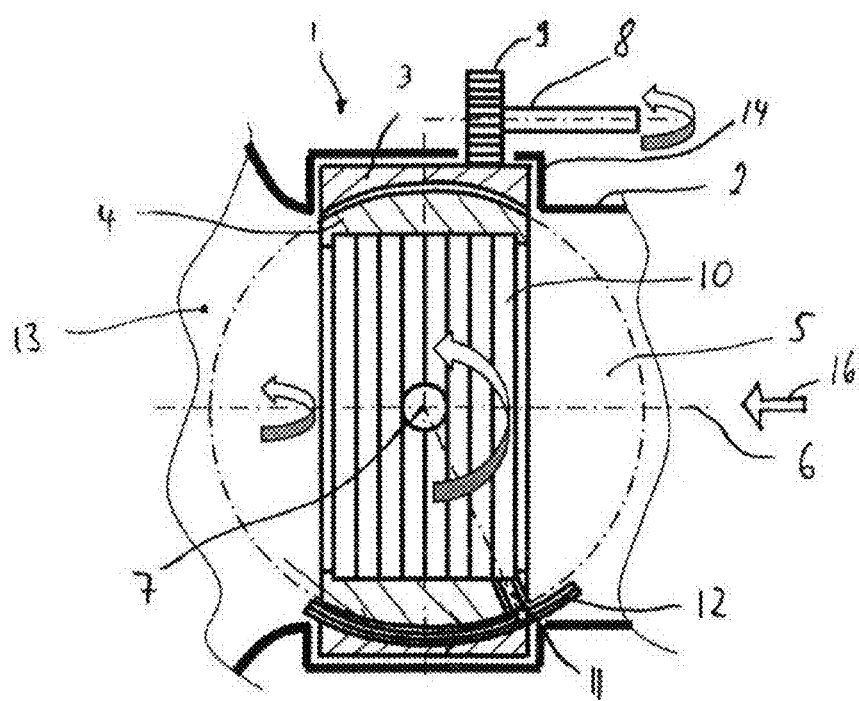
FIG. 1 is a sectional view of an air vent according to the invention, wherein a first control element and a second control element, which are movable relative to one another and are connected to one another by a coupling element, are arranged in a housing.

FIG. 1 shows a schematic sectional view of an air vent 1. The air vent 1 is largely composed of a housing 2, which forms a flow passage 5 in its interior. Located inside of the flow passage 5 in FIG. 1 are a first control element 3 and a second control element 4. The discharge region 13 of the air vent 1 is shown to the left of the control elements 3, 4.

The control elements 3 and 4 are accommodated in a receptacle region 14 inside of the housing 2. The receptacle region 14 in this design is implemented as a circumferential recess in the housing 2. The flow passage 5, which is delimited by the housing 2, has a circular cross-section in the embodiment from FIG. 1.

The first control element 3 can be rotated inside of the housing 2 by means of a gear 9, which engages through a recess on the receptacle region 14 of the housing 2. The gear 9 is adjusted by means of a drive element 8 in this design. The drive element 8 can be connected to an actuator or a manually adjustable control element, for example.

A rotation of the drive element 8 or of the gear 9 can cause the first control element 3, which is implemented as a hollow, cylindrical body, to be rotated about a first axis of rotation 6 inside of the housing 2. The receptacle region 14 here is designed such that a relative motion of the first control element 3 along the primary flow direction 16 of the flow passage 5 is avoided. The control element 3 has only one degree of freedom for a rotation about the first axis of rotation 6.

The second control element 4 is located inside of the first control element 3. The second control element 4 is likewise composed of a hollow, cylindrical body that can slide on curved sliding surfaces on an inner surface of the first control element 3.

In addition, the second control element 4 has, in its interior, a stack of annular disks 10 such as is usually used to deflect an air flow within an air vent 1 into a directed air flow or into a diffuse air flow.

The precise structure of the stack of annular disks 10 is shown in the following figures. These annular disks constitute the air deflection elements inside of the air vent 1.

The disk from the stack of annular disks 10 facing away from the discharge region 13 is connected to the first control element 3 by a coupling element 11 that passes through the outside wall of the second control element 4. The coupling element 11 is composed of a pin here. The coupling element 11 in this design is guided in a slide guide 12, which is located on the inward-facing surface of the first control element 3. The slide guide 12 here is designed such that a relative motion of the first control element 3 about the axis of rotation 6 triggers a constrained motion of the annular disks in the stack of annular disks 10. To this end, the slide guide 12 has a guide groove that extends essentially along the primary flow direction 16 or along the first axis of rotation 6 inside of the housing 2. The slide guide 12 is patterned on the curved outer walls of the second control element 4 or the curved inner walls of the first control element 3.

The slide guide projects past the first control element 3 in the primary flow direction 16. In this way an adjustment range of the coupling element 11 inside the slide guide 12 is implemented that is larger than the spatial extent of the first control element 3 along the primary flow direction 16.

The second control element 4 is rotatably mounted about an axis of rotation 7 that is perpendicular to the first axis of rotation 6. In this design, the second control element 4 can be rotated relative to the first control element 3 about the axis of rotation 7. Such a rotation of the second control element 4 causes the coupling element 11 to move within the slide guide 12. Depending on the direction of rotation of the second control element 4, in this process the coupling element 11 is moved toward the discharge region 13 or away from discharge region 13.

A rotation of the second control element 4 in this case causes no motion of the first control element 3 or of the annular disks in the stack of annular disks 10. The motion of the second control element 4 is thus decoupled from the motion of the stack of annular disks 10 or of the first control element 3. It is only a motion of the first control element 3 about the axis of rotation 6 that results in a constrained motion of the stack of annular disks 10 or of the individual annular disks via the coupling element 11.

The individual annular disks of the stack of annular disks 10 are connected to one another such that a motion of the annular disk that is connected to the first control element 3 via the coupling element 11 is transmitted to the remaining annular disks. In this way, a rotation of the individual annular disks about a common, third axis of rotation takes place. During this process, the annular disks are rotated relative to one another.

A rotation of the annular disks causes the flow in the flow passage 5 to be deflected such that a diffuse air flow arises at the flow outlet 13. In a normal position of the annular disks, the disks are arranged in the flow passage 5 such that only a very small deflection of the air stream is produced inside of the flow passage 5. In this way, directed air flow, also referred to as focused air flow, can be produced.

Figure 2:
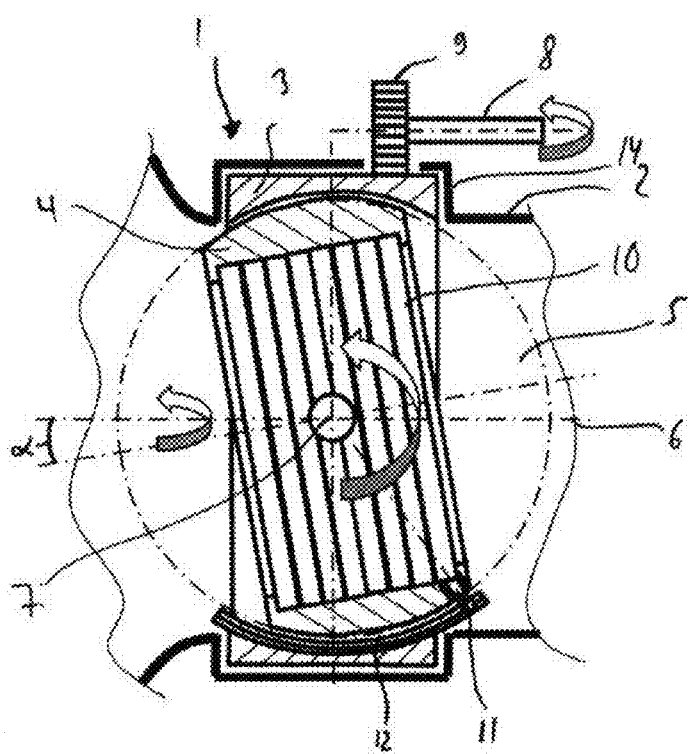
FIG. 2 is another sectional view of an air vent from FIG. 1, wherein the second control element is moved by an angle of rotation about an axis of rotation.

FIG. 2 shows another representation of the air vent 1 that was already shown in FIG. 1. Consequently, the reference characters are the same as those in FIG. 1.

While FIG. 1 shows an undeflected state of both the first and second control elements 3 and 4, in FIG. 2 the second control element 4 is rotated about the axis of rotation 7 by the angle α. It is especially evident that, because of the rotation of the second control element 4, a deflection of the coupling element 11 within the slide guide 12 has also taken place. Because the coupling element 11 is rigidly connected to one of the annular disks of the stack of annular disks 10, a rotation of the control element 4, and hence of the stack of annular disks 10, about the axis 7 of necessity results in a deflection of the coupling element 11.

But because the slide guide 12, as already described in FIG. 1, has a groove that extends essentially along the primary flow direction 16 of the flow passage 5, a motion of this nature does not result in a constrained motion of the first control element 3, which has the slide guide 12. Rather, the coupling element 11 slides inside the slide guide along the primary flow direction 16.

It is evident in FIG. 2 that the slide guide 12 projects past the first control element 3 on both sides in the primary flow direction 16 through the flow passage 5. This is especially advantageous for being able to produce the widest possible adjustment range of the second control element 4 about the axis of rotation 7.

In addition to the coupling element 11, additional stop elements that limit a rotation of the second control element 4 about the axis of rotation 7 may also be provided between the first control element 3 and the second control element 4.

Figure 3:
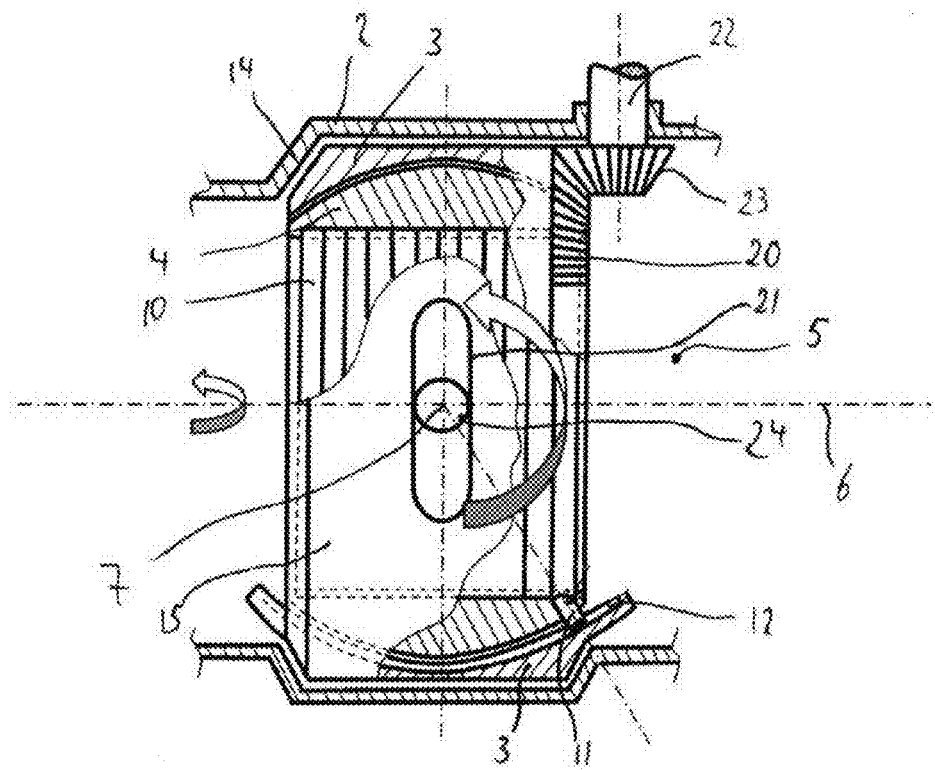
FIG. 3 is another sectional view of an air vent according to the invention using the functional principle from FIGS. 1 and 2, wherein the engineering design is modified.

FIG. 3 shows another sectional view of an air vent 1. The basic structure of the air vent from FIG. 3 accords with the structure of the air vents from FIGS. 1 and 2. The engineering design in FIG. 3, for example of the housing 2, differs slightly from the representation in FIGS. 1 and 2.

This is evident in a different design of the receptacle region 14, for example. In FIG. 3 this is composed of a set-back wall that runs parallel to the center axis of the flow passage 5. The walls that form the region of the flow passage 5 with a smaller diameter are connected to the set-back wall by short connecting regions. The short connecting regions are not perpendicular to the set-back wall, but instead extend at an angle to it that is not equal to 90°. Moreover, at least in one region, the first control element 3 is not supported by such a short connecting region but rather by the gear 23, which allows adjustment of the first control element 3.

In FIG. 3 the drive element 22 is connected to a gear 23, wherein the gear 23 is implemented as a ring gear. The first control element 3 has a toothed structure 20 on its outer circumference with which the ring gear 23 meshes. In this way, an orientation of the drive element 22 at right angles to the axis of rotation 6 of the first control element 3 can be achieved. This can be advantageous for a space-saving arrangement, for example.

The air vent 1 from FIG. 3 is additionally composed of a first control element 3, which is arranged in the interior of the housing 2. Also located in the interior of the first control element 3 is a second control element 4, and a stack of annular disks 10 is inside of the second control element 4.

In contrast to FIGS. 1 and 2, FIG. 3 shows a partial section of the external surface 15 of the first control element 3. It is evident here that an opening 21 is provided in the external surface 15. This opening 21 extends in a radially circumferential direction on the external surface 15 of the first control element 3 and is implemented in the form of an oblong hole.

A support element 24 that is associated with the second control element 4 engages in the opening 21 in this design. The second control element is supported in the housing 2 by means of the support element 24. The control element 4 here is mounted on the housing 2 such that it can only rotate about the axis 7.

A relative motion of the first control element 3 about the second control element 4 is made possible by the design of the opening 21 in the form of an oblong hole. The relative motion is delimited here by the dimension of the opening 21. Because the support element 24 is rigidly attached to the housing 2, the support element 24 simultaneously constitutes a stop for the first control element 3 for its relative motion about the axis of rotation 6.

Not shown in FIG. 3 because it is masked by the remaining elements of the air vent 1 is a second opening, which is essentially opposite the first opening 21 and is located on the external surface of the first control element 3 facing away from the viewer.

Figure 4:
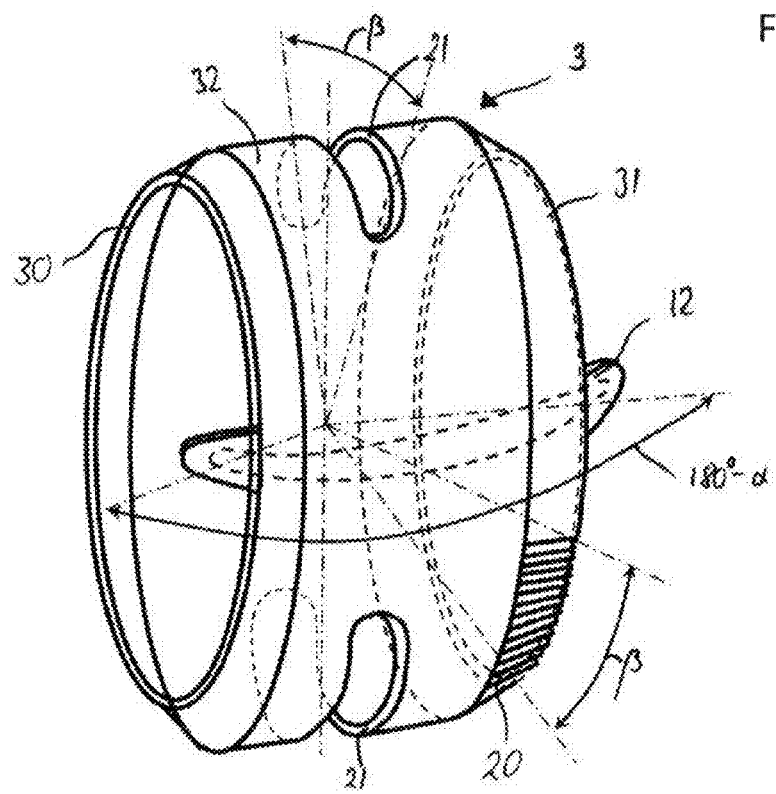
FIG. 4 is a perspective view of the first control element of an air vent from FIG. 1 through 3.

FIG. 4 shows a perspective view of the first control element 3. The first control element 3 here is composed largely of a straight, hollow cylindrical region 32 that is adjoined at both ends by a tapered region 30 or 31. Shown on the right-hand tapered region 31 is the toothed structure 20 with which the ring gear 23 shown in FIG. 3 meshes in order to produce a relative motion of the first control element 3 about the axis of rotation 6.

Also shown in FIG. 4 is the angle $\beta$, which represents the maximum possible rotation of the first control element 3 about the second control element 4. The angle $\beta$ is determined by the geometry of the opening 21 in this design. The longer the opening 21 is made, the greater the possible angle of rotation $\beta$ is.

Moreover, the angle $\beta$ is also shown in the region of the toothed structure 20 in FIG. 4. The toothed structure 20 is not designed to be fully circumferential along the first control element 3, but instead is only in a region that suffices to permit an adjustment of the first control element 3 by the angle $\beta$, which is defined by the opening 21.

The two mutually opposite openings 21 are shown in FIG. 4. Also shown in FIG. 4 is the slide guide 12, which projects past the straight cylindrical region 32 and the tapered region 31, especially in the right-hand region of the first control element 3. A dashed line is used to indicate the groove inside the slide guide 12 that the coupling element 11 can slide in.

The possible adjustment range of the second control element 4 inside of the first control element 3 is labeled $180°-\alpha$ in FIG. 4. The two tapered regions 30 and 31 here can represent, e.g., a stop for the second control element 4 in the interior of the first control element 3. By tapering the cross-section of the first control element 3, a locking of the second control element 4 can be brought about. The delimitation of the rotational motion of the second control element 4 inside of the first control element 3 can also be produced by a different manner of providing stop elements.

Figure 5:
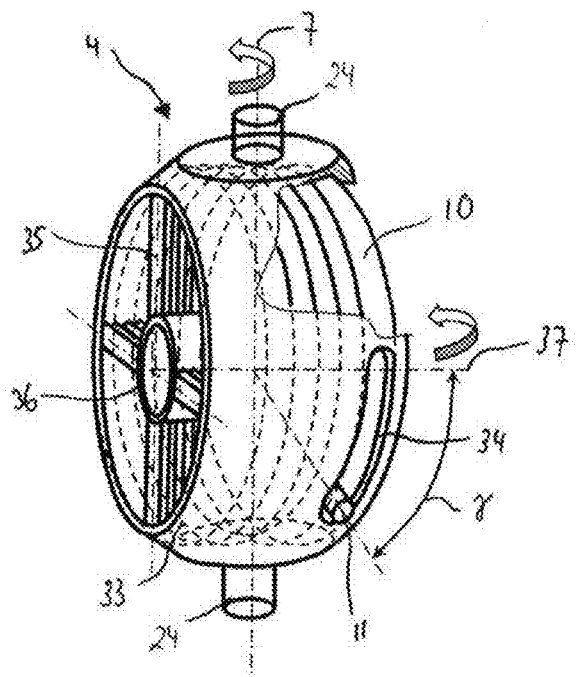
FIG. 5 is a perspective view of the second control element of an air vent from FIG. 1 through 3.

FIG. 5 shows a perspective view of the second control element 4 such as is arranged inside of the first control element 3 in FIG. 1 through 3. Here, the second control element 4 is composed essentially of a cylindrical hollow body that has a flattened area 38 at both its bottom and top regions. The support elements 24 are arranged on this flattened area 38. These support elements 24 are implemented in this design as cylindrical extensions that are arranged along the axis of rotation 7 on the second control element 4. Achieved by means of the flattened areas 38 is, firstly, a support of the second control element 4 inside of the first control element, and secondly, improved ease of movement of the second control element 4.

The external surface 33 of the second control element 4 is modeled essentially on a spherical body. The external surface 33 represents a partial section of such a spherical body. The internal surface of the first control element 3 follows the external surface 33 of the second control element in order to permit the two control elements 3, 4 to slide on one another.

A plurality of air deflection elements 35 and 36 are located in the interior of the second control element 4. The air deflection elements 35 in this design are implemented as cross-shaped elements that are arranged around a cylindrical hollow body 36. The third axis of rotation 37, about which the individual air deflection elements 35 are rotatably mounted, extends in the center of the cylindrical hollow body 36. The air deflection elements 35 are composed of the annular disks from the stack of annular disks 10.

The individual air deflection elements 35 or the individual annular disks from the stack of annular disks 10 can be rotated relative to one another by means of the coupling element 11. To this end, the individual air deflection elements 35 are connected to one another such that the motion of one of the air deflection elements 35 triggers a constrained motion of the air deflection elements 35 next to it.

Provided in the external surface 33 of the second control element 4 is an opening 34, which is implemented as an oblong hole. The coupling element 11 can be moved within this opening 34. The maximum angle of motion $\gamma$ is delimited here by the geometry of the opening 34. A motion of the coupling element 11 inside of the opening 34 is caused here by a relative motion of the first control element 3 about the second control element 4. The third axis of rotation 37 is perpendicular to the second axis of rotation 7.

Figure 6:
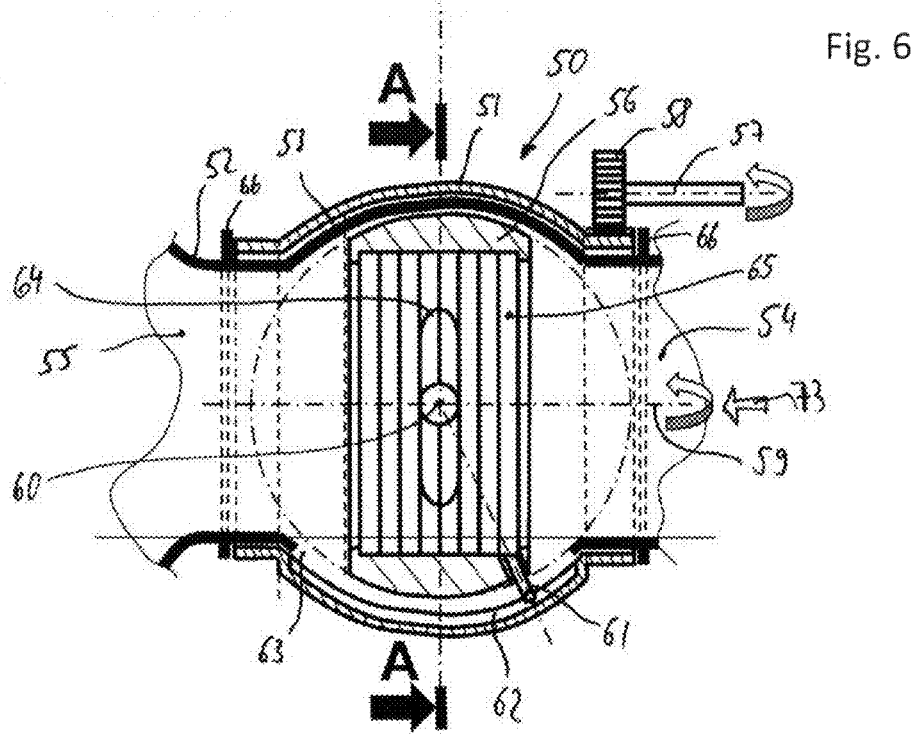
FIG. 6 is a sectional view of an alternative embodiment of an air vent according to the invention, wherein the first control element is located outside of the housing and the second control element is located inside of the housing.

FIG. 6 shows an alternative implementation of an air vent 50. In contrast to the embodiment of the air vent 1 from FIG. 1 through 3, the first control element 51 is now arranged outside of the housing 52. The second control element 56 here is similar in design to the second control element 4 from FIGS. 1 through 3 and 5.

Provided outside of the housing 52 is a drive element 57, which acts on the first control element 51 via a gear 58. In this way, an adjustment of the first control element 51 about the first axis of rotation 59 can be produced.

The first control element 51 is fixed in its position between stop elements 66, which are located on the outer perimeter of the housing 52. The housing 52 forms an approximately spherical receptacle region 53, which serves to accommodate the second control element 56 in the interior of the housing 52. The first control element 51 is patterned on the shape of the housing 52, and encloses it from outside.

In the bottom region of the housing 52, a recess 63 is provided, through which the coupling element 61 of the second control element 56 engages a slide guide 62 of the first control element 51. The recess 63 here is advantageously designed to permit both a motion of the coupling element 61 along the primary flow direction 73 and a motion of the coupling element 61 about the axis of rotation 59.

In like manner, the slide guide 62 again has a groove in which the coupling element 61 can slide, essentially along the primary flow direction 73 of the flow passage 54. The size of the recess 63 and the length of the slide guide 62, or of the groove in the slide guide 62, depend essentially on how big the adjustment range is of the second control element 56 inside the housing 52.

Also shown in FIG. 6 is an opening 64, which extends circumferentially in a radial direction in an external surface—not shown—of the first control element 51. The opening 64 is implemented as an oblong hole. The support element 67 passes through the opening 64 in this design. The support element 67 here is connected to the external surface of the second control element 56, as is shown in FIG. 5 by way of example. The functional principle of the air vent 50 corresponds largely to the functional principle of the preceding air vents 1.

The relative motion of the first control element 51 relative to the second control element 56 is delimited by means of the opening 64.

The second control element 56 is supported by the support elements 67 in the housing 52 such that it can rotate about the axis 60.

Figure 7:
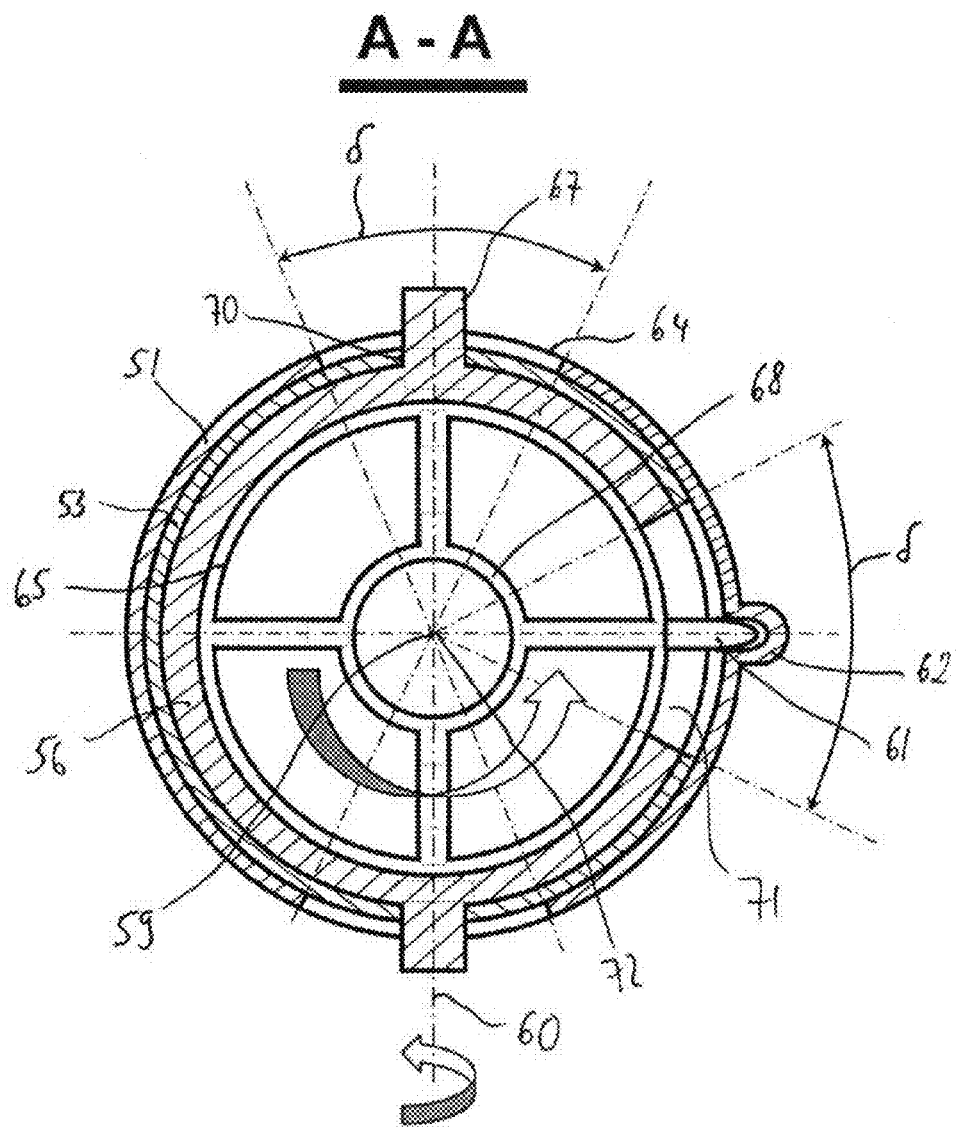
FIG. 7 is a sectional view through an air vent from FIG. 6, wherein the section runs in a plane that is perpendicular to the primary direction of flow or to the first axis of rotation of the first control element.

FIG. 7 shows a sectional view through the air vent 50 that was already described in connection with FIG. 6. The sectional view here is shown along the sectioning plane A-A from FIG. 6.

It can be seen in FIG. 7 how the support element 67 passes through the housing 52 and in doing so is rotatably supported on the bearing point 70 in the housing 52. It can also be seen that the support element 67 is positioned inside of the opening 64 of the first control element 51. The dimensioning of the opening 64 results in a possible adjustment angle of the first control element 51 about the control element 56, which is labeled with the reference symbol 6.

Indicated in the interior of the second control element 56 is an air deflection element 68, which has a cross-shaped region and a hollow, cylindrical region. The hollow, cylindrical region is concentric to the first axis of rotation 59 inside of the second control element 56. The air deflection elements 68 are composed of the annular disks in the stack of annular disks located in the second control element 56. From the air deflection element 68, a coupling element 61 leads through the recess 63 in the housing 52 into a slide guide 62 of the first control element 51.

It is evident in FIG. 7 that a rotation of the first control element 51 about the axis of rotation 59 in a range of the angle δ causes a rotational motion of the individual air deflection elements 68 as a result of a coupling with the coupling element 61. In this process, the air deflection elements 68 are rotated about the third axis of rotation 72, which is congruent with the axis of rotation 59 in the embodiment from FIG. 7. Because of the opening 71 in the second control element 56, however, no rotation of the second control element 56 is caused thereby. The third axis of rotation 72 can also be deflected from the axis of rotation 59 by means of a rotation of the second control element 56 about the axis of rotation 60.

The embodiments of the air vents shown in FIG. 1 through 7 have the character of examples. They illustrate the concept of the invention, and are not restrictive, especially with regard to the engineering design, the geometry, and the dimensions. The individual features of the exemplary embodiments that are shown can be combined with one another.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:
1. An air vent comprising:
   a housing forming a flow passage;
   a first control element supported on the housing so as to be rotatable about a first axis of rotation;
   a second control element supported on the housing so as to be rotatable about a second axis of rotation, the second axis of rotation being perpendicular to the first axis of rotation; and
   a coupling element adapted to connect the first control element to the second control element,
   wherein the first and second control elements are movable relative to one another,
   wherein the coupling element is guided in a slide-type guide in the first control element, and
   wherein the second control element has a plurality of air deflection elements that are mounted so as to be rotatable relative to one another about a common, third axis of rotation, wherein the third axis of rotation is perpendicular to the second axis of rotation in its orientation.
2. An air vent comprising:
   a housing forming a flow passage;
   a first control element supported on the housing so as to be rotatable about a first axis of rotation;
   a second control element supported on the housing so as to be rotatable about a second axis of rotation, the second axis of rotation being perpendicular to the first axis of rotation; and
   a coupling element adapted to connect the first control element to the second control element,
   wherein the first and second control elements are movable relative to one another,
   wherein the second control element has a plurality of air deflection elements that are mounted so as to be rotatable relative to one another about a common, third axis of rotation, wherein the third axis of rotation is perpendicular to the second axis of rotation in its orientation, and
   wherein a rotation of the air deflection elements relative to one another about the third axis of rotation is produced by a rotation of the first control element about the first axis of rotation.

3. An air vent comprising:

a housing forming a flow passage;

a first control element supported on the housing so as to be rotatable about a first axis of rotation;

a second control element supported on the housing so as to be rotatable about a second axis of rotation, the second axis of rotation being perpendicular to the first axis of rotation; and a coupling element adapted to connect the first control element to the second control element, wherein the first and second control elements are movable relative to one another, wherein the second control element is supported in the housing by openings or at least one opening of the first control element, wherein the openings are composed of two oblong holes arranged essentially opposite one another or the at least one opening is composed of an oblong hole, and wherein the oblong holes have or the oblong hole has a radial orientation around the circumference of the first control element, and wherein a relative motion of the first control element about the second control element is delimited by walls that delimit the openings in the second control element.

4. The air vent according to claim 1, wherein a rotation of the second control element about the second axis of rotation is executed without reaction with regard to a constrained motion of the first control element and/or of the air deflection elements.

5. An air vent comprising:

a housing forming a flow passage;

a first control element supported on the housing so as to be rotatable about a first axis of rotation;

a second control element supported on the housing so as to be rotatable about a second axis of rotation, the second axis of rotation being perpendicular to the first axis of rotation; and a coupling element adapted to connect the first control element to the second control element, wherein the first and second control elements are movable relative to one another, and wherein the second control element is composed of a rotationally symmetric hollow body or of a hollow, cylindrical body, and wherein an opening is provided in the external surface of the hollow body or of the hollow cylinder through which the coupling element passes.

6. The air vent according to claim 1, wherein a connection between the first control element and the air deflection elements of the second control element are produced through the coupling element.

7. The air vent according to claim 1, wherein the first axis of rotation is essentially parallel in its orientation to a primary flow direction of the flow passage.

8. The air vent according to claim 1, wherein the first control element and the second control element are arranged inside of the housing or wherein the first control element is arranged outside of the housing and the second control element is arranged inside of the housing.

9. The air vent according to claim 1, wherein the slide-type guide is configured such that, when the second control element is rotated about the second axis of rotation, the coupling element is movable in the slide-type guide without affecting the first control element and/or the air deflection elements.

10. The air vent according to claim 5, wherein the opening of the second control element is an oblong hole and wherein a rotational motion of the first control element about the first axis of rotation causes the coupling element to be carried along by the oblong hole of the second control element via which a rotation of the air deflection elements relative to one another about the third axis of rotation is produced.

11. The air vent according to claim 1, wherein the air deflection elements are implemented as a stack of annular disks, as a swirl element, or as a swirler.

12. The air vent according to claim 3, wherein the oblong holes have a lenticular, convex, concave, or biconvex or biconcave cross-section.

13. The air vent according to claim 1, wherein the slide-type guide is a groove provided in an inner surface of the first control element.

* * * * *